United States Patent
Hayama

(10) Patent No.: US 8,730,446 B2
(45) Date of Patent: May 20, 2014

(54) LIQUID CRYSTAL DISPLAY PANEL, AND METHOD FOR TESTING SUBSTRATE FOR LIQUID CRYSTAL DISPLAY PANEL

(75) Inventor: Takafumi Hayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 188 days.

(21) Appl. No.: 13/497,388

(22) PCT Filed: Sep. 24, 2010

(86) PCT No.: PCT/JP2010/005773
§ 371 (c)(1),
(2), (4) Date: Mar. 21, 2012

(87) PCT Pub. No.: WO2011/086621
PCT Pub. Date: Jul. 21, 2011

(65) Prior Publication Data
US 2012/0224132 A1   Sep. 6, 2012

(30) Foreign Application Priority Data

Jan. 14, 2010   (JP) ................................ 2010-005557

(51) Int. Cl.
| | |
|---|---|
| *G02F 1/1339* | (2006.01) |
| *G02F 1/13* | (2006.01) |
| *G02F 1/1335* | (2006.01) |
| *G02F 1/1337* | (2006.01) |

(52) U.S. Cl.
USPC ........... 349/153; 349/192; 349/114; 349/123; 349/124

(58) Field of Classification Search
CPC ... G02F 1/1339; G02F 1/1341; G02F 1/1345; G02F 1/133351; G02F 1/13394; G02F 1/136259; G02F 1/1309; G02F 2001/136263; G02F 2001/136368; G02F 2001/136275; G02F 1/133555; G02F 1/133371; G02F 1/136227; G02F 1/1337; G02F 1/133788

USPC .......................... 349/153, 192, 114, 123, 124
See application file for complete search history.

(56) References Cited

U.S. PATENT DOCUMENTS

| | | | | |
|---|---|---|---|---|
| 2005/0073638 | A1* | 4/2005 | Byun et al. ................... | 349/156 |
| 2007/0091247 | A1* | 4/2007 | Onda ............................ | 349/153 |
| 2009/0268130 | A1 | 10/2009 | Yeh et al. | |
| 2012/0050719 | A1* | 3/2012 | Hayama ........................ | 356/51 |

FOREIGN PATENT DOCUMENTS

| | | |
|---|---|---|
| JP | 6-186515 A | 7/1994 |
| JP | 2002-182224 A | 6/2002 |
| JP | 2007-101985 A | 4/2007 |
| JP | 2007-114361 A | 5/2007 |
| JP | 2009-8868 A | 1/2009 |

OTHER PUBLICATIONS

European Search Report dated May 28, 2013.

* cited by examiner

*Primary Examiner* — Mike Qi
(74) *Attorney, Agent, or Firm* — Birch, Stewart, Kolasch & Birch, LLP

(57) ABSTRACT

A liquid crystal display panel (1) includes a TFT substrate (10), a CF substrate (20) facing the TFT substrate (10), a liquid crystal layer (25) provided between the TFT substrate (10) and the CF substrate (20), an alignment film configured to control alignment of the liquid crystal layer (25), and a sealing member (26) sandwiched between the TFT substrate (10) and the CF substrate (20) and formed in the shape of a frame surrounding the liquid crystal layer (25). In a region (35) where the sealing member (26) is to be provided, a metal pattern (2) is provided which is configured to reflect infrared light emitted from a Fourier transform infrared spectrometer toward the Fourier transform infrared spectrometer in order to determine the presence or absence of the alignment film in the region (35).

20 Claims, 11 Drawing Sheets

LIQUID CRYSTAL DISPLAY PANEL, AND METHOD FOR TESTING SUBSTRATE FOR LIQUID CRYSTAL DISPLAY PANEL

TECHNICAL FIELD

The present invention relates to liquid crystal display panels, in which a pair of substrates are joined together with a predetermined gap being interposed therebetween and a liquid crystal layer (display medium layer) is enclosed in the gap between the substrates, and methods for testing substrates for liquid crystal display panels.

BACKGROUND ART

In recent years, liquid crystal display panels, which have advantages such as thin thickness, light weight, low-voltage drive, and low power consumption, have been widely used as display panels for various electronic apparatuses such as mobile terminals (e.g., mobile telephones etc.), notebook personal computers, etc.

In general, a liquid crystal display panel includes a pair of substrates (i.e., a thin film transistor (TFT) substrate and a color filter (CF) substrate) facing each other, a liquid crystal layer provided between the pair of substrates, an alignment film which is used to control the alignment of the liquid crystal layer, and a frame-shaped sealing member which is used to bond the pair of substrates together and enclose liquid crystal between the pair of substrates.

Here, in general, the alignment film is formed by applying polyimide resin using a printing technique etc. and thereafter baking. The alignment film is formed on the substrate in a display region and in the vicinity of the sealing member provided around the display region. In this case, if the alignment film is formed in a region where the sealing member is to be provided, then when the sealing member is applied and formed, the alignment film existing between the sealing member and the substrate disadvantageously decreases the bonding strength of the sealing member.

Also, for example, if the alignment film is made of polyimide resin, the moisture permeability of polyimide resin allows the alignment film extending outside the sealing member to absorb ambient moisture, so that the liquid crystal layer inside the sealing member is disadvantageously contaminated.

In order to overcome the drawback, techniques of removing the alignment film formed in the region where the sealing member is to be provided have been proposed. More specifically, for example, a technique of removing the alignment film formed in the region where the sealing member is to be provided, by irradiating with laser light after formation of the alignment film, has been described (see, for example, PATENT DOCUMENT 1). Also, a technique of removing the alignment film formed in the region where the sealing member is to be provided, by using a liftoff technique of removing a water-soluble resist by washing with pure water in a washing step after formation of the alignment film, has been described (see, for example, PATENT DOCUMENT 2).

CITATION LIST

Patent Documents

PATENT DOCUMENT 1: Japanese Patent Publication No. 2007-114361
PATENT DOCUMENT 2: Japanese Patent Publication No. 2009-8868

SUMMARY OF THE INVENTION

Technical Problem

Although, in the techniques described in PATENT DOCUMENTS 1 and 2, the alignment film formed in the region where the sealing member is to be provided can be removed, the presence or absence of the alignment film in the region where the sealing member is to be provided cannot be determined, and therefore, it is disadvantageously difficult to determine whether or not the alignment film has been successfully removed.

It is contemplated that the presence or absence of the alignment film may be determined by visual observation using an optical microscope. In this technique, however, the result of the determination varies from person to person, and considerable effort and time are required, and in addition, it is disadvantageously necessary to destroy the liquid crystal display panel.

Therefore, the present invention has been made in view of the above problems. It is an object of the present invention to provide a liquid crystal display panel in which the presence or absence of an alignment film in a region where a sealing member is to be provided can be determined and it can be reliably determined whether or not the alignment film has been successfully removed from the region where a sealing member is to be provided, and a method for testing a substrate for the liquid crystal display panel.

Solution to the Problem

To achieve the object, a liquid crystal display panel according to the present invention includes a first substrate, a second substrate facing the first substrate, a liquid crystal layer provided between the first substrate and the second substrate, an alignment film provided on a side closer to the liquid crystal layer of each of the first and second substrates, and configured to control alignment of the liquid crystal layer, and a sealing member sandwiched between the first substrate and the second substrate, configured to bond the first substrate and the second substrate together, and formed in the shape of a frame surrounding the liquid crystal layer. In a region where the sealing member is to be provided, a metal pattern is provided which is configured to reflect infrared light emitted from a Fourier transform infrared spectrometer toward the Fourier transform infrared spectrometer in order to determine the presence or absence of the alignment film in the region.

With this configuration, as a mark for determining the presence or absence of the alignment film in the region where the sealing member is to be provided, the metal pattern which reflects infrared light emitted from a Fourier transform infrared spectrometer toward the Fourier transform infrared spectrometer is provided in the region where the sealing member is to be provided. Therefore, the Fourier transform infrared spectrometer can be used to perform a microscopic reflection technique, and therefore, based on an infrared absorption spectrum measured by the Fourier transform infrared spectrometer, the presence or absence of the alignment film in the region where the sealing member is to be provided can be determined. Thus, the presence or absence of the alignment film can be determined by non-contact measurement. In particular, after removal of the alignment film existing in the region where the sealing member is to be provided, the presence or absence of the alignment film in the region where the sealing member is to be provided can be determined. Therefore, it can be reliably confirmed whether or not the alignment film has been successfully removed from the region where the sealing member is to be provided.

As is different from confirmation performed by visual observation using an optical microscope, the result of determination of the presence or absence of the alignment film does not vary from person to person, and in addition, the presence or absence of the alignment film can be determined without destroying the liquid crystal display panel.

Because the presence or absence of the alignment film can be easily determined by non-contact measurement, even if the alignment film exists in the region where the sealing member is to be provided, the alignment film can be removed quickly and easily.

Therefore, the productivity and the yield can be improved.

The metal pattern is provided to perform a microscopic reflection technique using the Fourier transform infrared spectrometer, and therefore, the presence or absence of the alignment film can be determined at low cost.

The metal pattern is provided in the region where the sealing member is to be provided. Therefore, the presence or absence of the alignment film can be determined without impairing the external appearance.

In the liquid crystal display panel of the present invention, the metal pattern may be positioned so that an inner circumferential surface of the metal pattern and an inner circumferential surface of the region are on the same plane.

With this configuration, the alignment film can be blocked at the position of the inner circumferential surface of the metal pattern, whereby the formation of the alignment film in the region where the sealing member is to be provided can be effectively reduced or prevented.

In the liquid crystal display panel of the present invention, the metal pattern may be formed in the shape of a frame along an inner circumferential surface of the region.

With this configuration, the presence or absence of the alignment film can be determined by non-contact measurement over the entire region where the sealing member is to be provided.

In the liquid crystal display panel of the present invention, the metal pattern may have a width of 50 µm or more.

With this configuration, in the Fourier transform infrared spectrometer, the accuracy of detection of infrared light reflected by a surface of the metal pattern can be improved.

In the liquid crystal display panel of the present invention, a thickness C of the metal pattern and a distance D between the first substrate and the second substrate in a thickness direction of the liquid crystal display panel may satisfy a relationship $C<D$.

With this configuration, when the first substrate and the second substrate are bonded together via the sealing member, it is possible to avoid the problem that, due to its thickness, the metal pattern interferes with the bonding of the first substrate and the second substrate. Therefore, the liquid crystal display panel can be manufactured without changing the manufacture conditions.

In the liquid crystal display panel of the present invention, the metal pattern may be made of one selected from the group consisting of tantalum, chromium, molybdenum, nickel, titanium, copper, and aluminum.

With this configuration, the metal pattern can be made of a low-cost and versatile metal material.

In the liquid crystal display panel of the present invention, the metal pattern may be provided on at least one of the first and second substrates.

In the liquid crystal display panel of the present invention, the liquid crystal display panel may be driven in a passive matrix scheme or in an active matrix scheme.

A method according to the present invention is provided for testing a liquid crystal display panel substrate including a substrate, an alignment film provided on the substrate and configured to control alignment of a liquid crystal layer, and a metal pattern provided on the substrate in a region where a sealing member is to be provided. The method includes, at least, an irradiation step of irradiating the metal pattern with infrared light using a Fourier transform infrared spectrometer, a measurement step of receiving the infrared light reflected by the metal pattern using the Fourier transform infrared spectrometer to measure an infrared absorption spectrum, and a determination step of determining, based on the infrared absorption spectrum, the presence or absence of the alignment film in the region.

With this configuration, the infrared light reflected by the metal pattern is received by the Fourier transform infrared spectrometer to measure an infrared absorption spectrum, whereby the presence or absence of the alignment film in the region is determined. Therefore, by performing a microscopic reflection technique using the Fourier transform infrared spectrometer, the presence or absence of the alignment film in the region where the sealing member is to be provided can be determined. Thus, the presence or absence of the alignment film can be determined by non-contact measurement.

Because the presence or absence of the alignment film can be easily determined by non-contact measurement, even if the alignment film exists in the region where the sealing member is to be provided, the alignment film can be removed quickly and easily. Therefore, the productivity and the yield can be improved.

The metal pattern is provided to perform a microscopic reflection technique using the Fourier transform infrared spectrometer, and therefore, the presence or absence of the alignment film can be determined at low cost.

The metal pattern is provided in the region where the sealing member is to be provided. Therefore, the presence or absence of the alignment film can be determined without impairing the external appearance.

When various alignment film removal techniques are examined, the effectiveness of these alignment film removal techniques can be easily determined. Therefore, the alignment film removal techniques can be examined easily and quickly.

In the liquid crystal display panel substrate testing method of the present invention, in the determination step, the infrared absorption spectrum measured using the Fourier transform infrared spectrometer may be compared with another infrared absorption spectrum previously stored, to determine the presence or absence of the alignment film in the region.

With this configuration, the infrared absorption spectrum measured using the Fourier transform infrared spectrometer is compared with another infrared absorption spectrum previously stored, to determine the presence or absence of the alignment film in the region. Therefore, the presence or absence of the alignment film can be tested quickly and accurately using a simple technique.

In the liquid crystal display panel substrate testing method of the present invention, in the irradiation step, the infrared light polarized in parallel to an incidence plane may be incident at an incident angle between 75° and 85° inclusive.

With this configuration, when an infrared absorption spectrum is measured using the Fourier transform infrared spectrometer, the infrared absorption spectrum can be measured using a high-sensitivity reflection technique (or reflection absorption spectroscopy). Therefore, a thin film (alignment film) existing on a surface of the metal pattern can be detected with considerably high sensitivity. Therefore, even if the alignment film is considerably thin, the presence or absence of the alignment film in the region where the sealing member is to be provided can be tested.

Advantages of the Invention

According to the present invention, the presence or absence of the alignment film in the region where the sealing member is to be provided can be determined by non-contact measurement. It can be reliably confirmed whether or not the alignment film has been successfully removed from the region where the sealing member is to be provided. the presence or absence of the alignment film in the region where the sealing member is to be provided can be determined quickly and easily without destroying the liquid crystal display panel.

DESCRIPTION OF EMBODIMENTS

Embodiments of the present invention will be described hereinafter with reference to the accompanying drawings. Note that the present invention is not intended to be limited to the embodiments described below.

Figure 1:
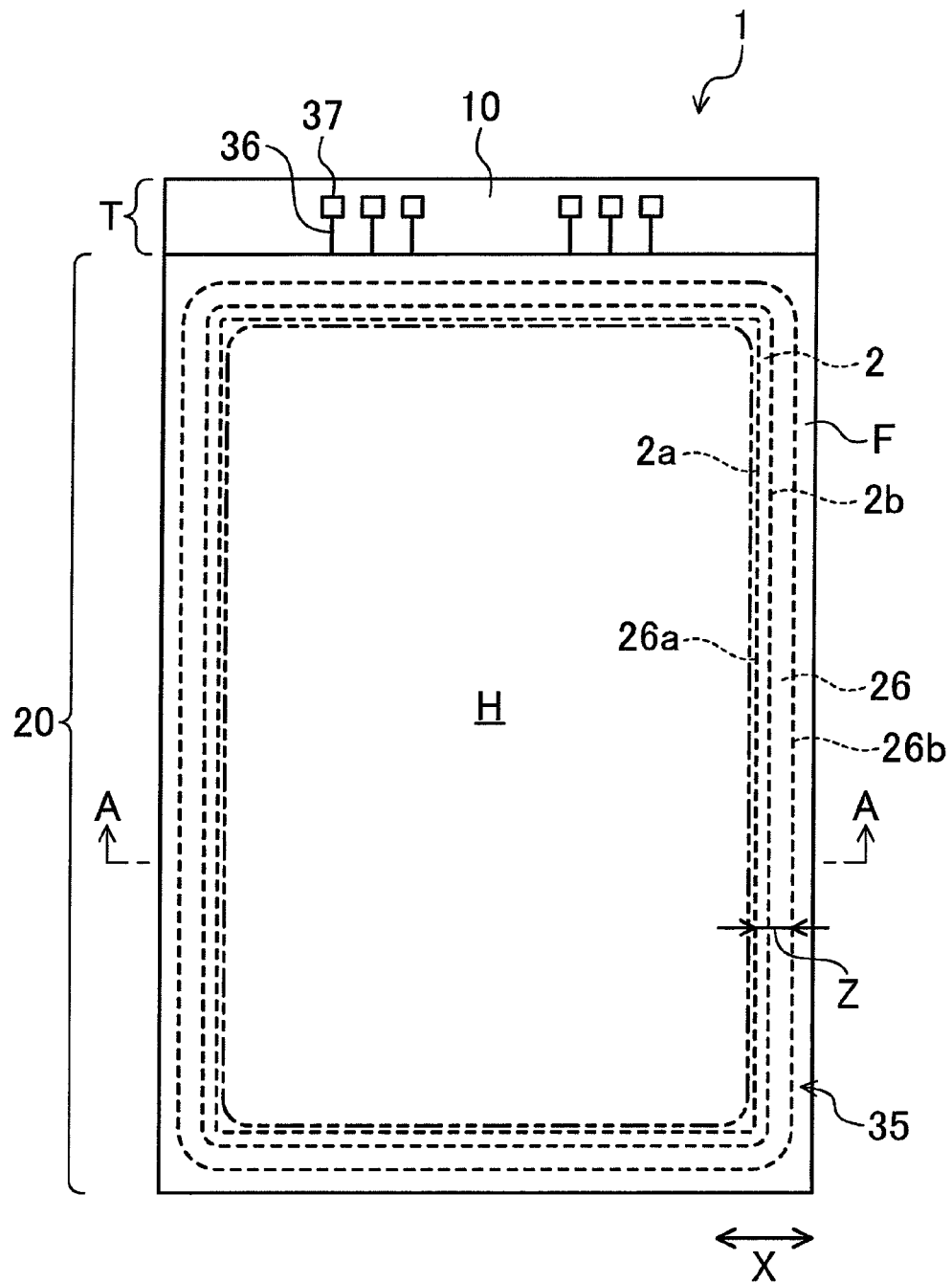
FIG. 1 is a plan view showing a general configuration of a liquid crystal display panel according to an embodiment of the present invention.
Figure 2:
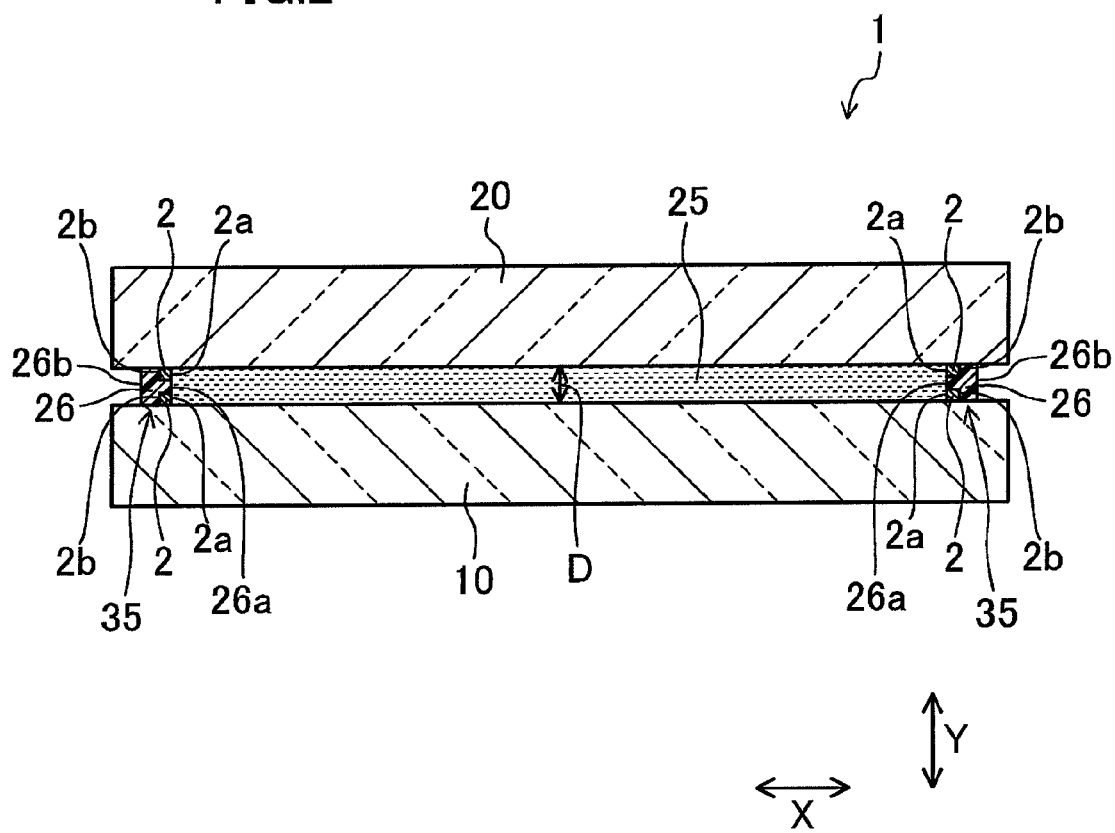
FIG. 2 is a cross-sectional view taken along line A-A of FIG. 1.
Figure 3:
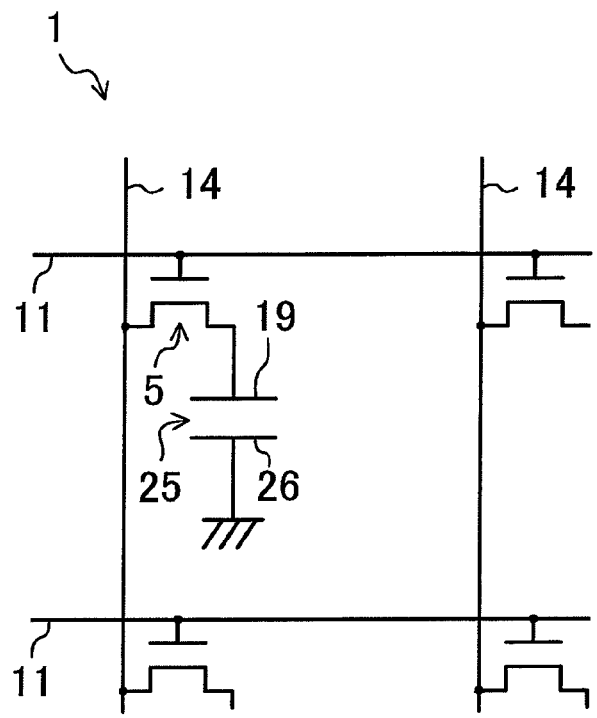
FIG. 3 is a diagram showing an equivalent circuit of the liquid crystal display panel of the embodiment of the present invention.
Figure 4:
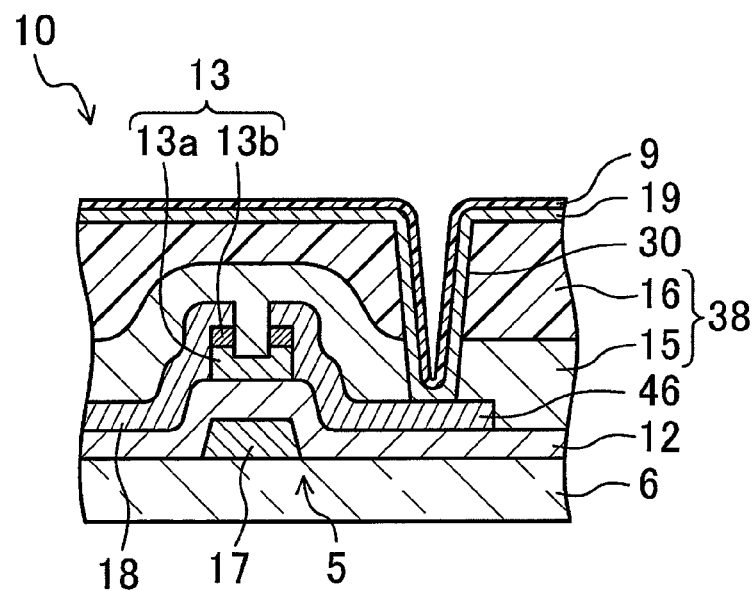
FIG. 4 is a cross-sectional view showing a general configuration of a TFT substrate included in the liquid crystal display panel of the embodiment of the present invention.
Figure 5:
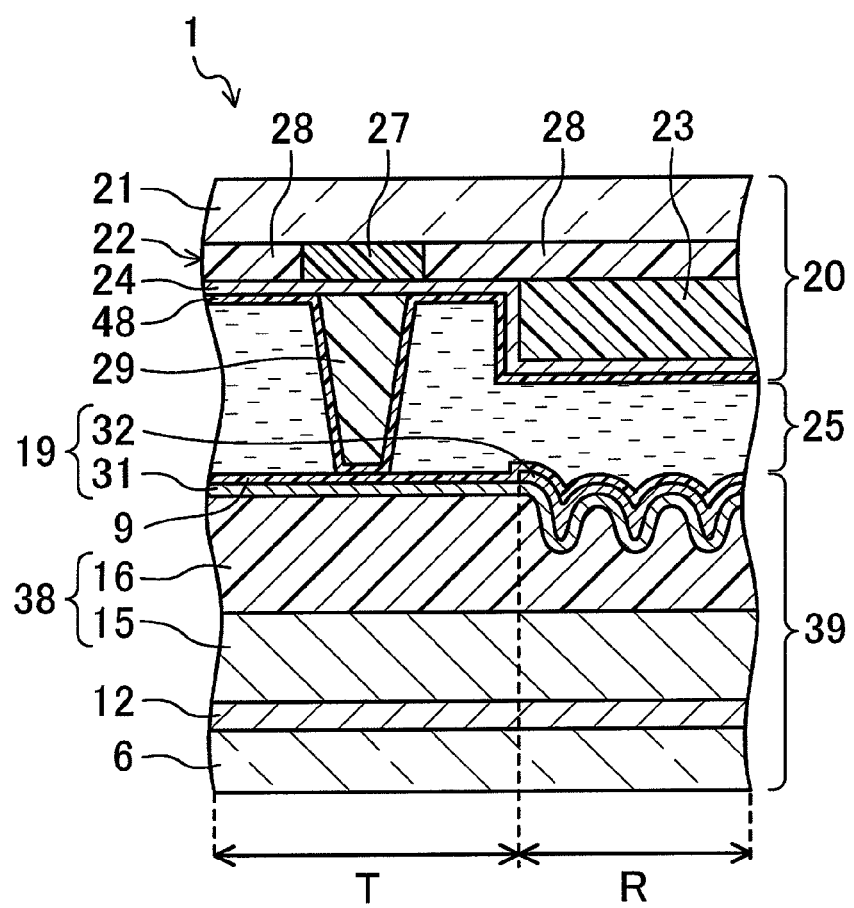
FIG. 5 is a cross-sectional view showing a general configuration of a display portion of the liquid crystal display panel of the embodiment of the present invention.
Figure 6:
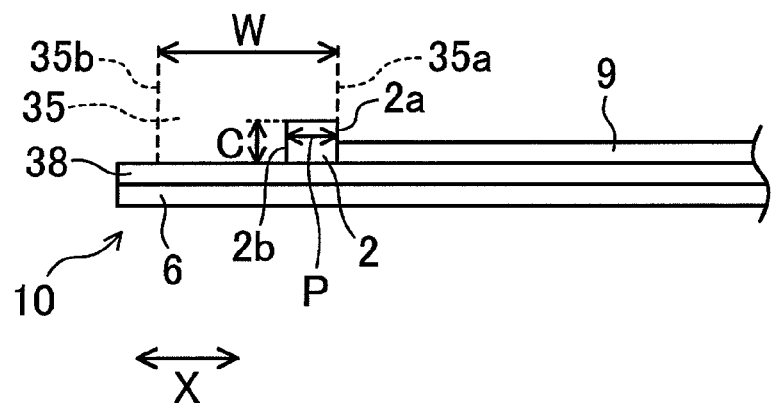
FIG. 6 is a cross-sectional view showing the general configuration of the TFT substrate included in the liquid crystal display panel of the embodiment of the present invention.
Figure 7:
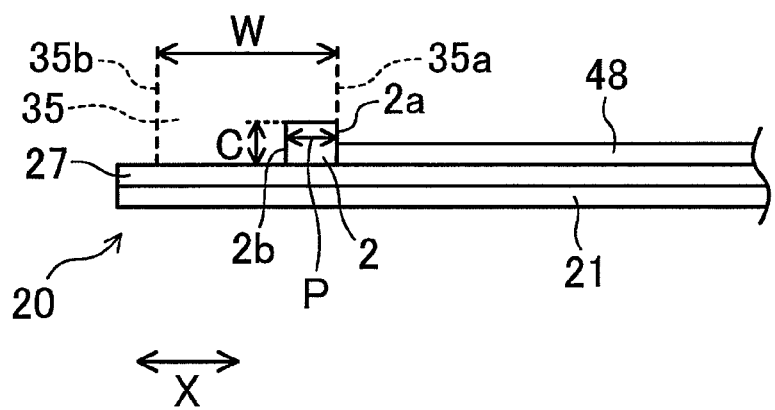
FIG. 7 is a cross-sectional view showing a general configuration of a CF substrate included in the liquid crystal display panel of the embodiment of the present invention.

FIG. 1 is a plan view showing a general configuration of a liquid crystal display panel according to an embodiment of the present invention. FIG. 2 is a cross-sectional view taken along line A-A of FIG. 1. FIG. 3 is a diagram showing an equivalent circuit of the liquid crystal display panel of the embodiment of the present invention. FIG. 4 is a cross-sectional view showing a general configuration of a TFT substrate included in the liquid crystal display panel of the embodiment of the present invention. FIG. 5 is a cross-sectional view showing a general configuration of a display portion of the liquid crystal display panel of the embodiment of the present invention. FIG. 6 is another cross-sectional view showing the general configuration of the TFT substrate included in the liquid crystal display panel of the embodiment of the present invention. FIG. 7 is a cross-sectional view showing a general configuration of a CF substrate included in the liquid crystal display panel of the embodiment of the present invention.

As shown in FIGS. 1 and 2, the liquid crystal display panel 1 includes the TFT substrate 10 (a first substrate (a substrate for a liquid crystal display panel)), the CF substrate 20 (a second substrate (a substrate for a liquid crystal display panel)) facing the TFT substrate 10, and a liquid crystal layer 25 (display medium layer) provided between the TFT substrate 10 and the CF substrate 20. The liquid crystal display panel 1 also includes a frame-shaped sealing member 26 which is sandwiched between the TFT substrate 10 and the CF substrate 20 to bond the TFT substrate 10 and the CF substrate 20 together and enclose the liquid crystal layer 25. The sealing member 26 is formed to surround the liquid crystal layer 25. The TFT substrate 10 and the CF substrate 20 are bonded together via the sealing member 26.

As shown in FIG. 1, in the liquid crystal display panel 1, the TFT substrate 10 protrudes from the CF substrate 20 at an upper side thereof. The protruding portion forms a terminal region T into which a plurality of interconnects 36 described below, such as gate lines, source lines, etc., are extended and in which a plurality of terminals 37 for driving the liquid crystal display panel 1 are provided and connected to the interconnects 36.

In the liquid crystal display panel 1, a display region (or a middle region) H for displaying an image is provided in a region where the TFT substrate 10 and the CF substrate 20 overlap. Here, the display region H includes a plurality of pixels arranged in a matrix (each pixel is the smallest unit of an image).

The TFT substrate 10 also has a picture-frame region F which is formed around the display region H and does not contribute to displaying. As shown in FIG. 1, the picture-frame region F is formed in the shape of a frame around the display region H.

Note that, as shown in FIG. 1, the sealing member 26 is formed in the shape of a rectangular frame surrounding the entire perimeter of the display region H. The sealing member 26 has a frame width Z which is, but not particularly limited to, between 0.5 mm and 2.0 mm inclusive, for example.

The liquid crystal layer 25 is made of, for example, a nematic liquid crystal material, which has electro-optic properties.

As shown in FIGS. 3 and 4, the TFT substrate 10 includes an insulating substrate 6 (a glass substrate or a plastic substrate, etc.), a plurality of gate lines 11 provided on the insulating substrate 6 and extending in parallel to each other, and a gate insulating film 12 covering the gate lines 11. The TFT substrate 10 also includes a plurality of source lines 14 provided on the gate insulating film 12 and extending in a direction perpendicular to the gate lines 11 and in parallel to each other, a plurality of TFTs 5 provided at respective corresponding intersection portions of the gate lines 11 and the source line 14, and an interlayer insulating film 38 including a first interlayer insulating film 15 and a second interlayer insulating film 16 which are successively formed to cover the source lines 14 and the TFTs 5. The TFT substrate 10 also includes a plurality of pixel electrodes 19 arranged in a matrix on the second interlayer insulating film 16 and connected to the respective corresponding TFTs 5, and an alignment film 9 covering the pixel electrodes 19.

As shown in FIG. 4, the TFT 5 includes a gate electrode 17 which is a laterally protruding portion of the corresponding gate line 11, the gate insulating film 12 covering the gate electrode 17, an island-like semiconductor layer 13 on the gate insulating film 12 directly above the gate electrode 17, and a source electrode 18 and a drain electrode 46 provided on the semiconductor layer 13 and facing each other. Here, the source electrode 18 is a laterally protruding portion of the corresponding source line 14. As shown in FIG. 4, the drain electrode 46 is connected to the pixel electrode 19 via a contact hole 30 formed in the first interlayer insulating film 15 and the second interlayer insulating film 16. As shown in FIG. 5, the pixel electrode 19 includes a transparent electrode 31 provided on the second interlayer insulating film 16, and a reflective electrode 32 provided on a surface of the transparent electrode 31. As shown in FIG. 4, the semiconductor layer 13 includes an intrinsic amorphous silicon layer $13a$ as the lower layer and an $n^+$ amorphous silicon layer $13b$ doped with phosphorus as the upper layer. The intrinsic amorphous silicon layer $13a$ exposed through the source electrode 18 and the drain electrode 46 forms a channel region.

Note that the configuration of the TFT substrate 10 is not limited to this. Alternatively, for example, an underlying insulating film may be provided below the gate insulating film 12, or a protective film or an organic insulating film may be provided above the first interlayer insulating film 15 and the second interlayer insulating film 16.

As shown in FIG. 5, in the display portions of the TFT substrate 10 and the liquid crystal display panel 1 including the TFT substrate 10, the reflective electrode 32 forms a reflective region R, and the transparent electrode 31 exposed through the reflective electrode 32 forms a transmissive region T.

As shown in FIG. 5, the second interlayer insulating film 16 as the lower layer of the pixel electrode 19 has an uneven surface, and the reflective electrode 32 provided on the surface of the second interlayer insulating film 16 with the transparent electrode 31 being interposed therebetween, also has an uneven surface.

Note that the reflective region R may not be necessarily required, and only the transmissive region T may be provided.

Examples of a material for the first interlayer insulating film 15 include, but are not particularly limited to, silicon oxide ($SiO_2$), silicon nitride ($SiN_x$ (x is a positive integer)), etc. The first interlayer insulating film 15 preferably has a thickness between 600 nm and 1000 nm inclusive. This is because if the thickness of the first interlayer insulating film 15 is smaller than 600 nm, it may be disadvantageously difficult to flatten the first interlayer insulating film 15, and if the thickness of the first interlayer insulating film 15 is greater than 1000 nm, it may be disadvantageously difficult to form the contact hole 30 by etching.

As shown in FIG. 5, the CF substrate 20 includes an insulating substrate 21 (a glass substrate or a plastic substrate, etc.), a color filter layer 22 provided on the insulating substrate 21, and a transparent layer 23 provided in the reflective region R of the color filter layer 22 and for compensating for a difference in light path between the reflective region R and the transmissive region T. The CF substrate 20 also includes a common electrode 24 covering the transmissive region T of the color filter layer 22 and the transparent layer 23 (i.e., the reflective region R), a pillar-like photospacer 29 provided on the common electrode 24, and an alignment film 48 covering the common electrode 24 and the photospacer 29. Note that the color filter layer 22 includes color layers 28 (a red color layer R, a green color layer G, or blue color layer B for each pixel), and a black matrix 27 (light blocking film). The black matrix 27 is provided between adjacent color layers 28 and plays a role in separating the color layers 28 from each other. Also, as shown in FIG. 5, the black matrix 27 faces an interlayer insulating film 39 included in the TFT substrate 10 with the photospacer 29 being interposed between the black matrix 27 and the interlayer insulating film 39.

Note that the photospacer 29 is, for example, made of an acrylic photosensitive resin and formed by photolithography.

The black matrix 27 is made of a metal material (tantalum (Ta), chromium (Cr), molybdenum (Mo), nickel (Ni), titanium (Ti), copper (Cu), aluminum (Al), etc.), a resin material in which a black pigment (carbon particles etc.) is dispersed, or a resin material including a multilayer structure of a plurality of light-transmissive color layers having different colors, etc.

Note that the configuration of the CF substrate 20 is not limited to this. Alternatively, for example, a protective film may be provided above the black matrix 27.

As shown in FIG. 5, the alignment films 9 and 48 are provided on sides closer to the liquid crystal layer 25 of the TFT substrate 10 and the CF substrate 20, respectively, and are used to control the alignment of the liquid crystal layer 25. The alignment films 9 and 48 are, for example, made of polyimide resin and formed by a printing technique (e.g., flexographic printing (transfer printing) as flexography, spin coating, etc.) or a droplet discharge technique of discharging droplets of a liquid material.

The alignment films 9 and 48 have a thickness of about 200 nm in the display region H and a thickness of several nanometers to several tens of nanometers in the vicinity of a region 35 where the sealing member 26 is to be provided other than the display region H.

The semi-transmissive liquid crystal display panel 1 is thus configured so that light entering through the CF substrate 20 in the reflective region R is reflected by the reflective electrode 32 while light from a backlight unit (not shown) entering through the TFT substrate 10 in the transmissive region T is allowed to travel therethrough.

The liquid crystal display panel 1 has one pixel for each pixel electrode. In each pixel, by applying a voltage having a predetermined magnitude to the liquid crystal layer 25 to change the alignment of the liquid crystal layer 25 and thereby adjust the rate of transmission of incident light from, for example, the backlight unit, an image is displayed.

In this embodiment, as shown in FIGS. 2, 6, and 7, a metal pattern 2 which is a reflective member is provided in the region 35 where the sealing member 26 is to be provided.

The metal pattern 2 is a mark for determining the presence or absence of the alignment films 9 and 48 in the region 35 where the sealing member 26 is to be provided. As described below, infrared light emitted from a Fourier transform infrared spectrometer (FT-IR device) is reflected back to the Fourier transform infrared spectrometer by the metal pattern 2 in order to determine the presence or absence of the alignment films 9 and 48 in the region 35 where the sealing member 26.

A material for the metal pattern 2 is not particularly limited if the material reflects infrared light. In terms of low cost and ease of formation, the metal pattern 2 may be made of the same material of the gate line 11 and the source line 14, i.e., tantalum (Ta), chromium (Cr), molybdenum (Mo), nickel (Ni), titanium (Ti), copper (Cu), aluminum (Al), etc.

As shown in FIGS. 1 and 2, the metal pattern 2 is formed around the liquid crystal layer 25, as with the sealing member 26. In a width direction X of the sealing member 26, a position of an inner circumferential surface (i.e., a surface closer to the liquid crystal layer 25 in the width direction X) 2a of the metal pattern 2 coincides with a position of an inner circumferential surface (i.e., a surface closer to the liquid crystal layer 25 in the width direction X) 26a of the sealing member 26.

Also, as shown in FIGS. 1 and 2, in the width direction X of the sealing member 26, an outer circumferential surface (i.e., a surface opposite to the liquid crystal layer 25 in the width direction X) 2b of the metal pattern 2 is located further inside (closer to the liquid crystal layer 25) than an outer circumferential surface (i.e., a surface opposite to the liquid crystal layer 25 in the width direction X) 26b of the sealing member 26.

Thus, the metal pattern 2 is extended in the width direction X of the sealing member 26 from the position of the inner circumferential surface 26a of the sealing member 26 toward the outer circumferential surface 26b of the sealing member 26.

In other words, as shown in FIGS. 6 and 7, in the TFT substrate 10 and the CF substrate 20 before being bonded together via the sealing member 26 (i.e., before the sealing member 26 is formed), in a width direction (i.e., the width direction of the sealing member 26) X of the region 35 where the sealing member 26 is to be provided, the position of the inner circumferential surface 2a of the metal pattern 2 coincides with a position of an inner circumferential surface (i.e., a surface closer to the liquid crystal layer 25 in the width direction X) 35a of the region 35. Thus, the metal pattern 2 is provided in the region 35 so that the inner circumferential surface 2a of the metal pattern 2 and the inner circumferential surface 35a of the region 35 are on the same plane.

As shown in FIGS. 1, 2, 6, and 7, the metal pattern 2 is also formed in the shape of a frame extending along the inner circumferential surface 35a of the region 35.

As shown in FIGS. 6 and 7, in the width direction X of the region 35, the outer circumferential surface 2b of the metal pattern 2 is also located further inside (closer to the liquid crystal layer 25) than an outer circumferential surface (i.e., a surface opposite to the liquid crystal layer 25 in the width direction X) 35b of the region 35.

Thus, the metal pattern 2 is extended in the width direction X of the region 35 from the position of the inner circumferential surface 35a of the region 35 toward the outer circumferential surface 35b of the region 35.

A thickness C of the metal pattern 2 is preferably thicker (e.g., about 500 nm) than the thickness (e.g., 200 nm) of the alignment films 9 and 48 in order to reliably block the alignment films 9 and 48 at the position of the inner circumferential surface 2a of the metal pattern 2. In general, the thickness of the alignment film in the vicinity of the sealing member region other than the display region is thinner (several nanometers to several tens of nanometers) than 200 nm. Therefore, if the thickness C is about 500 nm, a sufficient effect is expected.

In order to avoid the problem that, due to its thickness, the metal pattern 2 interferes with the bonding of the TFT substrate 10 and the CF substrate 20 via the sealing member 26, the thickness C of the metal pattern 2 is preferably smaller than a distance D (typically, about 3 μm) between the TFT substrate 10 and the CF substrate 20 in a thickness direction Y of the liquid crystal display panel 1. In other words, the relationship C<D is preferably satisfied.

In order to improve the detection accuracy of the Fourier transform infrared spectrometer (FT-IR device) for infrared light reflected by a surface of the metal pattern 2, the metal pattern 2 preferably has a width P of 50 μm or more (i.e., 50 μm or more from the inner circumferential surface 35a toward the outer circumferential surface 35b of the region 35).

In this embodiment, the region 35 where the sealing member 26 is to be provided has a width W which can be set between, for example, 0.5 mm and 2.0 mm inclusive, as with the frame width Z of the sealing member 26.

In order to reliably reflect infrared light emitted from the Fourier transform infrared spectrometer, the metal pattern 2 needs to be provided at an uppermost layer in each of the TFT substrate 10 and the CF substrate 20. Therefore, in the TFT substrate 10 of FIG. 6, the metal pattern 2 is provided on the interlayer insulating film 38 on which the alignment film 9 is provided. Similarly, in the CF substrate 20 of FIG. 7, the metal pattern 2 is provided on the black matrix 27 on which the alignment film 48 is provided.

Figure 8:
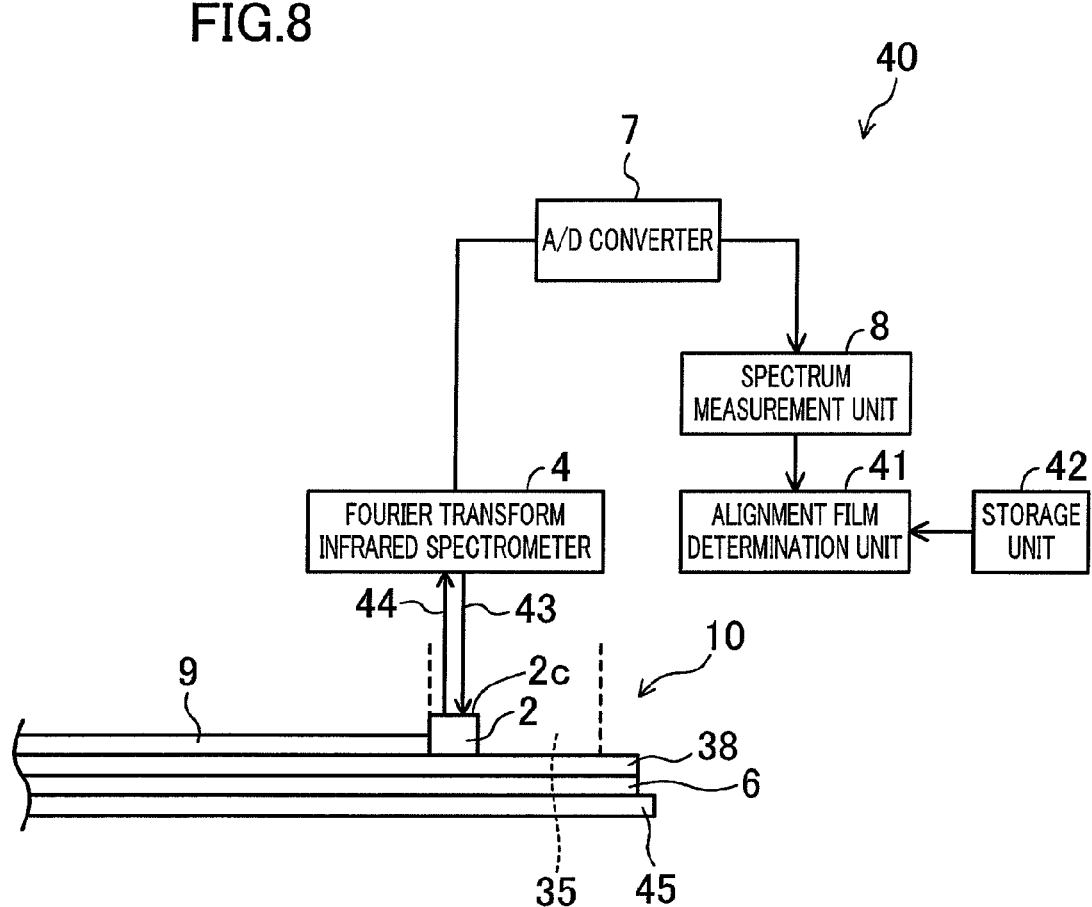
FIG. 8 is a diagram for describing a method for determining the presence or absence of an alignment film according to an embodiment of the present invention.
Figure 9:
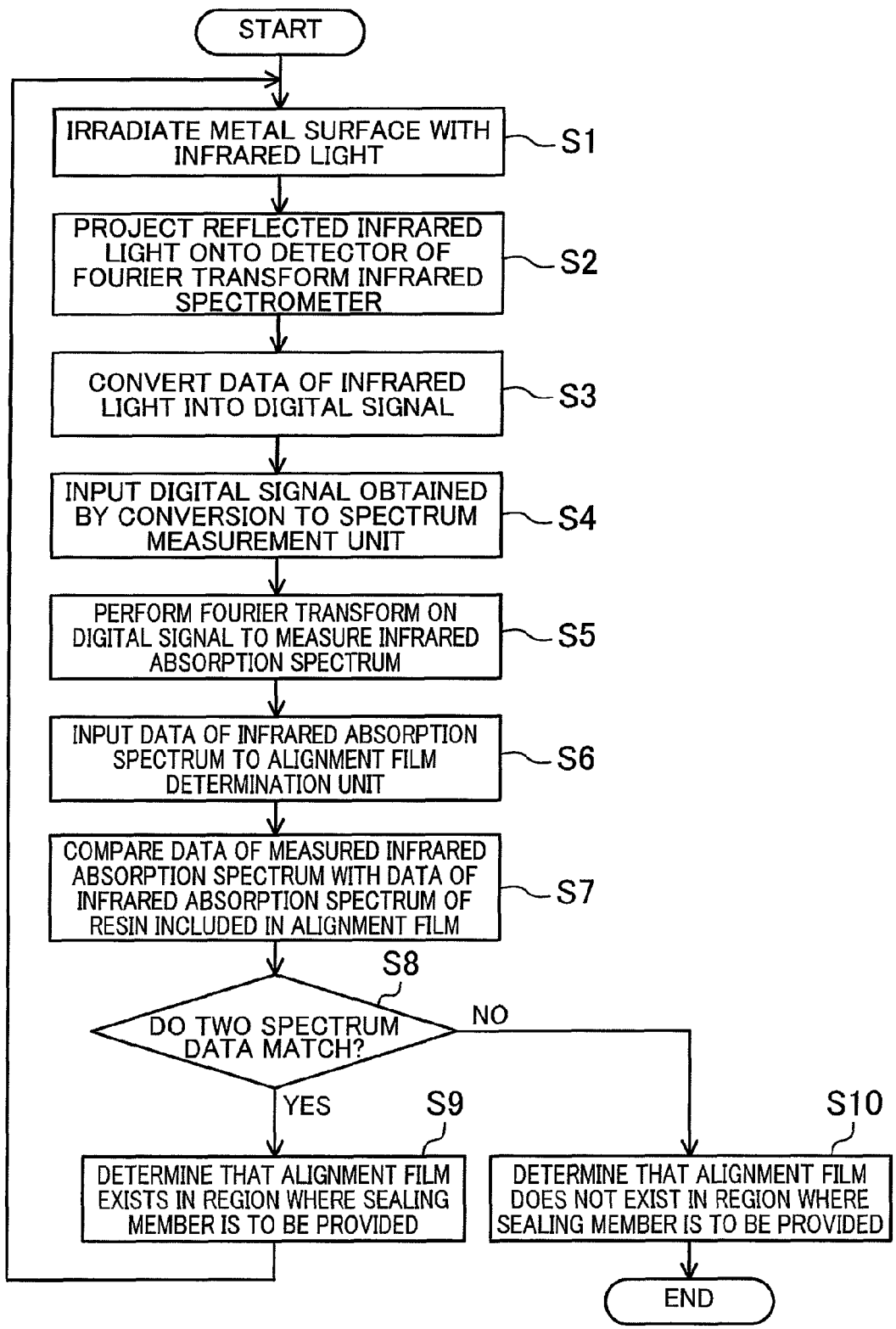
FIG. 9 is a flowchart for describing the method for determining the presence or absence of an alignment film according to the embodiment of the present invention.

Next, a method for testing the TFT substrate 10 and the CF substrate 20 for a liquid crystal display panel (i.e., a method for determining the presence or absence of an alignment film in a region where a sealing member is to be provided) will be described. FIG. 8 is a diagram for describing the method for determining the presence or absence of an alignment film according to an embodiment of the present invention. FIG. 9 is a flowchart for describing the method for determining the presence or absence of an alignment film according to the embodiment of the present invention. Note that, here, a method for determining the presence or absence of an alignment film in a region where a sealing member is to be provided in the TFT substrate 10 will be described by way of example.

As shown in FIG. 8, a determination device 40 for the liquid crystal display panel 1 of this embodiment includes a Fourier transform infrared spectrometer 4, an A/D converter 7 connected to the Fourier transform infrared spectrometer 4, and a spectrum measurement unit 8 which is connected to the A/D converter 7 and is used to measure an infrared absorption spectrum of a resin (e.g., polyimide resin) of which the alignment film 9 is made. The determination device 40 also includes an alignment film determination unit 41 which is connected to the spectrum measurement unit 8 and is used to determine the presence or absence of the alignment film 9 in the region 35 where the sealing member 26 is to be provided, and a storage unit 42 which is connected to the alignment film determination unit 41 and is used to store predetermined data for determining the presence or absence of the alignment film 9.

The presence or absence of the alignment film 9 in the region 35 where the sealing member 26 is to be provided is determined as follows. Initially the Fourier transform infrared spectrometer 4 emits infrared light 43 toward the metal pattern 2, so that a surface 2c of the metal pattern 2 is irradiated with the infrared light 43 (step S1).

Note that a movable stage 45 may be provided on which the TFT substrate 10 is placed and supported. The stage 45 may be freely moved so that the surface 2c of the metal pattern 2 is reliably irradiated with the infrared light 43 emitted from the Fourier transform infrared spectrometer 4.

The infrared light 43 is almost totally reflected by the surface 2c of the metal pattern 2, and the reflected infrared light 44 is projected back onto a light receiving surface of a detector provided in the Fourier transform infrared spectrometer 4, and the infrared light 44 reflected by the metal pattern 2 is received by the Fourier transform infrared spectrometer 4 (step S2).

More specifically, the infrared light 43 emitted from a light source of the Fourier transform infrared spectrometer 4 passes through an aperture which is provided in the Fourier transform infrared spectrometer 4 and is narrowed so that only a target region (i.e., a region where the metal pattern 2 is provided) is irradiated, and thereafter, is reflected by the surface 2c of the metal pattern 2 to pass through the aperture again, whereby diffracted light is removed. In other words, infrared light which has passed through the aperture, the metal pattern 2, and the aperture sequentially is projected onto the light receiving surface of the detector.

Next, data of the infrared light 44 projected onto the light receiving surface of the detector is converted from an analog signal into a digital signal by the A/D converter 7 (step S3). Next, the resulting digital signal is input to the spectrum measurement unit 8 (step S4), which performs a Fourier transform on the input digital signal, whereby an infrared absorption spectrum is measured (step S5).

Figure 10:
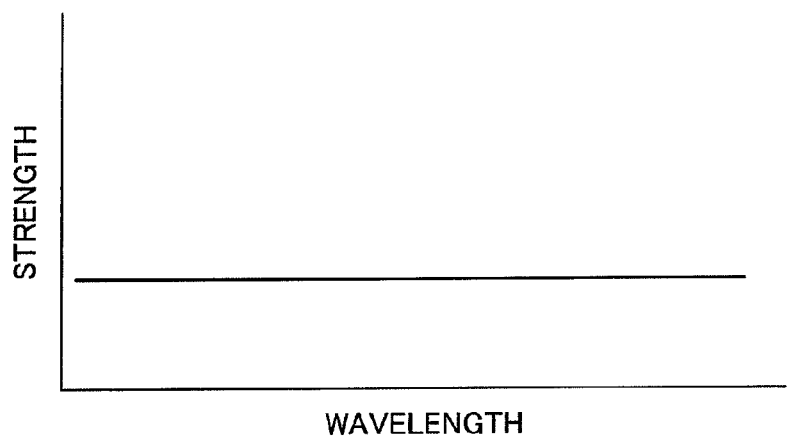
FIG. 10 is a diagram showing an example infrared absorption spectrum measured by a method for testing a substrate for a liquid crystal display panel according to an embodiment of the present invention.

Here, as shown in FIG. 8, if the alignment film 9 does not exist in the region 35 where the sealing member 26 is to be provided (i.e., the alignment film 9 is not extended beyond the inner circumferential surface 2a of the metal pattern 2 into the region 35 where the sealing member 26 is to be provided), the alignment film 9 does not exist on the surface 2c of the metal pattern 2 which is irradiated with the infrared light 43. Therefore, as shown in FIG. 10, a component corresponding to the alignment film 9 (i.e., a component corresponding to polyimide resin) does not appear in an infrared absorption spectrum measured by the spectrum measurement unit 8, i.e., there is not a peak in the measured infrared absorption spectrum.

Figure 11:
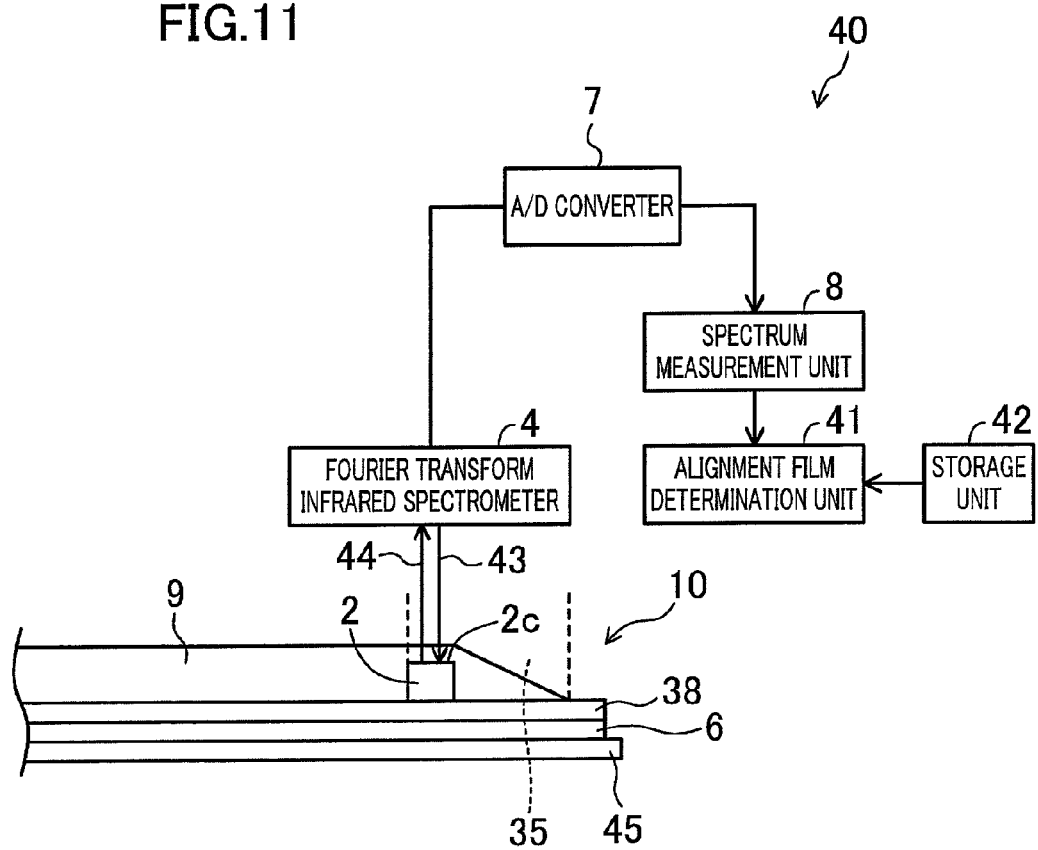
FIG. 11 is a diagram for determining the presence or absence of an alignment film according to an embodiment of the present invention.
Figure 12:
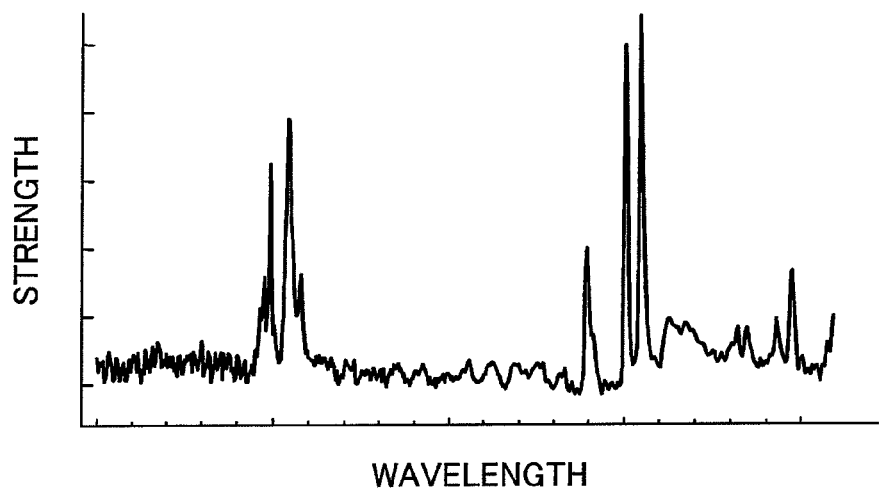
FIG. 12 is a diagram showing an example infrared absorption spectrum measured by the method for testing a substrate for a liquid crystal display panel according to the embodiment of the present invention.

On the other hand, as shown in FIG. 11, if the alignment film 9 exists in the region 35 where the sealing member 26 is to be provided (i.e., the alignment film 9 is extended beyond the inner circumferential surface 2a of the metal pattern 2 into the region 35 where the sealing member 26 is to be provided), the alignment film 9 exists on the surface 2c of the metal pattern 2 which is irradiated with the infrared light 43. Therefore, the infrared light 43 incident to the surface 2c of the metal pattern 2 is absorbed by a component (i.e., polyimide resin) of the alignment film 9. Therefore, as shown in FIG. 12, a component corresponding to the alignment film 9 (i.e., a component corresponding to polyimide resin) appears in an infrared absorption spectrum measured by the spectrum measurement unit 8, i.e., there is a peak in the measured infrared absorption spectrum.

Note that if the alignment film 9 exists in the region 35 where the sealing member 26 is to be provided, the infrared light 43 emitted from the Fourier transform infrared spectrometer 4 passes through the alignment film 9 to reach the surface 2c of the metal pattern 2. Thereafter, the infrared light 43 is almost totally reflected by the surface 2c of the metal pattern 2, and the reflected infrared light 44 passes through the alignment film 9 again and is then projected onto the light receiving surface of the detector of the Fourier transform infrared spectrometer 4.

More specifically, the infrared light 43 emitted from the light source of the Fourier transform infrared spectrometer 4 passes through the aforementioned aperture and then the alignment film 9, is reflected by the surface 2c of the metal pattern 2, and then passes through the aperture again, whereby diffracted light is removed. In other words, infrared light which has passed through the aperture, the alignment film 9, the metal pattern 2, the alignment film 9, and the aperture sequentially is projected onto the light receiving surface of the detector.

Next, data of the measured infrared absorption spectrum is input to the alignment film determination unit 41 (step S6). The alignment film determination unit 41 is connected to the storage unit 42 which stores data of an infrared absorption spectrum of the resin (e.g., polyimide resin) of which the alignment film 9 is made.

The alignment film determination unit 41 determines, based on the infrared absorption spectrum measured by the Fourier transform infrared spectrometer 4, whether or not the alignment film 9 exists in the region 35 where the sealing member 26 is to be provided.

More specifically, the alignment film determination unit 41 reads, from the storage unit 42, the infrared absorption spectrum data of the resin (e.g., polyimide resin) of the alignment film 9, and compares the data of the measured infrared absorption spectrum with the previously stored infrared absorption spectrum data of the resin of the alignment film 9 (step S7). The alignment film determination unit 41 determines whether or not the data of the measured infrared absorption spectrum matches the infrared absorption spectrum data of the resin of the alignment film 9 read from the storage unit 42 (step S8).

In other words, the alignment film determination unit 41 compares an infrared absorption spectrum measured by the Fourier transform infrared spectrometer 4 with an infrared absorption spectrum previously stored in the storage unit 42, to determine the presence or absence of the alignment film 9 in the region 35 where the sealing member 26 is to be provided.

For example, if, as shown in FIG. 11, the alignment film 9 exists in the region 35 where the sealing member 26 is to be provided, as shown in FIG. 12 an infrared absorption spectrum measured by the Fourier transform infrared spectrometer 4 is the infrared absorption spectrum of polyimide resin, and matches the infrared absorption spectrum data of the resin (i.e., polyimide resin) of the alignment film 9 read from the storage unit 42. Therefore, the alignment film determination unit 41 determines that the alignment film 9 exists in the region 35 where the sealing member 26 is to be provided (step S9).

On the other hand, if, as shown in FIG. 8, the alignment film 9 does not exist in the region 35 where the sealing member 26 is to be provided, as shown in FIG. 10 an infrared absorption spectrum measured by the Fourier transform infrared spectrometer 4 does not have a peak and does not match the infrared absorption spectrum data of the resin (i.e., polyimide resin) of the alignment film 9 read from the storage unit 42. Therefore, the alignment film determination unit 41 determines that the alignment film 9 does not exist in the region 35 where the sealing member 26 is to be provided (step S10).

Note that if it is determined that the alignment film 9 exists in the region 35 where the sealing member 26 is to be provided, the alignment film 9 existing in the region 35 where the sealing member 26 is to be provided is removed, and thereafter, steps S1-S10 are performed again to determine the presence or absence of the alignment film 9 in the region 35 where the sealing member 26 is to be provided (i.e., it is determined whether or not the alignment film 9 has been successfully removed from the region 35 where the sealing member 26 is to be provided), thereby confirming that the alignment film 9 does not exist in the region 35 where the sealing member 26 is to be provided.

In the Fourier transform infrared spectrometer of this embodiment, the measurement is preferably performed using a wavelength in a mid-infrared wavelength region (wavelength: 2.5-25 μm) which is easily absorbed by a functional group of an organic compound molecule.

The wave number (the reciprocal of the wavelength) is preferably 4000-650 cm$^{-1}$. In this wave number range, not only polyimide resin but also most organic materials can be identified. Therefore, it can be said that a low wave number region (650-400 cm$^{-1}$) is not required.

Moreover, among FT-IR detectors, a mercury-cadmium-tellurium (MCT) detector, which has a relatively high sensitivity, is preferably used. Note that, the measurable wave number region of the MCT detector is 4000-650 cm$^{-1}$. Because the MCT detector does not have detection capability in the aforementioned low wave number region (650-400 cm$^{-1}$), it can be said that the low wave number region (650-400 cm$^{-1}$) is not required even when the MCT detector is used.

Figure 13:
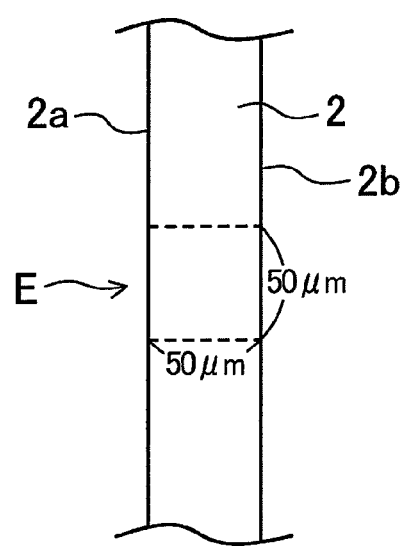
FIG. 13 is a plan view showing a metal pattern in the liquid crystal display panel of the embodiment of the present invention.

Assuming that the resolution during measurement is, for example, 4 cm$^{-1}$ and the number of integrations is 32, as shown in FIG. 13 an area E for a single measurement operation can be set to 50 μm (width)×50 μm (length). In the case of these settings, the measurement time is about two minutes, i.e., the measurement can be done considerably quickly.

Thus, in this embodiment, similar to the sealing member 26, the frame-shaped metal pattern 2 is provided along the inner circumferential surface 35a of the region 35, i.e., the metal pattern 2 is formed around the liquid crystal layer 25. As a result, the presence or absence of the alignment film 9 can be determined at any position in the entire region 35 where the sealing member 26 is to be provided.

Next, a method for manufacturing the liquid crystal display panel of this embodiment will be described by way of example. Note that the manufacturing method of this embodiment includes a TFT substrate fabrication process, a CF substrate fabrication process, and a substrate bonding process.

<TFT Substrate Fabrication Process>

Initially, for example, a titanium film, an aluminum film, and a titanium film, etc. are successively formed on the entire insulating substrate 6 by sputtering, and thereafter, patterning is performed by photolithography, thereby forming the gate line 11 and the gate electrode 17 each having a thickness of about 4000 Å.

Next, on the entire substrate on which the gate line 11 and the gate electrode 17 have been formed, for example, a silicon nitride film etc. is formed by plasma-enhanced chemical vapor deposition (CVD), thereby forming the gate insulating film 12 having a thickness of about 4000 Å.

Moreover, on the entire substrate on which the gate insulating film 12 has been formed, for example, an intrinsic amorphous silicon film (thickness: about 2000 Å) and an n$^+$ amorphous silicon film doped with phosphorus (thickness: about 500 Å) are successively formed by plasma-enhanced CVD, and thereafter, patterning is performed by photolithography, thereby forming, on the gate electrode 17, an island-like semiconductor formation layer having a multilayer structure of the intrinsic amorphous silicon layer and the n$^+$ amorphous silicon layer.

Thereafter, on the entire substrate on which the semiconductor formation layer has been formed, for example, an aluminum film and a titanium film, etc. are successively formed by sputtering, and thereafter, patterning is performed by photolithography, thereby forming the source line 14, the source electrode 18, and the drain electrode 46 each having a thickness of about 2000 Å.

Next, the n$^+$ amorphous silicon layer in the semiconductor formation layer is etched using the source electrode 18 and the drain electrode 46 as a mask to perform patterning, thereby forming a channel region. Thus, the semiconductor layer 13 and the TFT 5 including the semiconductor layer 13 are formed.

Moreover, on the entire substrate on which the TFT 5 has been formed, for example, a silicon nitride film etc. is formed by plasma-enhanced CVD, thereby forming the first interlayer insulating film 15 having a thickness of about 4000 Å.

Thereafter, on the entire substrate on which the first interlayer insulating film 15 has been formed, for example, a positive photosensitive resin having a thickness of about 3 μm is applied by spin coating, and the applied photosensitive resin is uniformly exposed to light with relatively low illuminance using a first photomask having a plurality of circular light blocking portions which are separated from each other and randomly distributed. Next, the applied photosensitive resin is uniformly exposed to light with relatively high illuminance using a second photomask having an opening at a position corresponding to the contact hole 30 on the drain electrode 46, and thereafter, is developed. As a result, the portion of the photosensitive resin exposed to light with high illuminance is completely removed, and the portion of the photosensitive resin exposed to light with low illuminance is partially removed, leaving about 40% of the thickness, and the unexposed portion of the photosensitive resin is partially removed, leaving about 80% of the thickness. Moreover, the substrate in which the photosensitive resin has been developed is heated to about 200° C., so that the photosensitive resin is melted, thereby forming the second interlayer insulating film 16 having the reflective region R which has a smooth uneven surface (including smooth protruding and recessed portions). Thereafter, the first interlayer insulating film 15 exposed through the second interlayer insulating film 16 is etched to form the contact hole 30.

Next, on the entire substrate (i.e., on the second interlayer insulating film 16), a transparent conductive film (e.g., an ITO film etc.) is formed by sputtering, and thereafter, patterning is performed by photolithography, thereby forming, on the insulating substrate 6, the transparent electrode 31 having a thickness of about 1000 Å.

Next, on the entire substrate on which the transparent electrode 31 has been formed, a molybdenum film (thickness: about 750 Å) and an aluminum film (thickness: about 1000 Å) are successively formed by sputtering. Thereafter, the reflective electrode 32 is formed on a surface of the transparent electrode 31 in the reflective region R by patterning by photolithography, thereby forming the pixel electrode 19 including the transparent electrode 31 and the reflective electrode 32.

Next, on the entire interlayer insulating film 38, for example, a titanium film and an aluminum film are formed by sputtering, and thereafter, patterning is performed by photolithography, thereby forming the metal pattern 2 having a predetermined thickness (e.g., about 500 nm) in the shape of a frame in the region 35 where the sealing member 26 is to be provided.

Next, the entire substrate is washed, and thereafter, polyimide resin is applied by a printing technique etc. on the entire substrate on which the pixel electrode 19 has been formed, and thereafter, a rubbing treatment is performed, thereby forming the alignment film 9 having a thickness of about 200 nm.

Next, by using the aforementioned determination method of steps S1-S10, the presence or absence of the alignment film 9 in the region 35 where the sealing member 26 is to be provided is performed.

In this case, as described above in step S10, if the alignment film determination unit 41 determines that the alignment film 9 does not exist in the region 35 where the sealing member 26 is to be provided, the fabrication process of the TFT substrate 10 is ended.

On the other hand, as described above in step S9, if the alignment film determination unit 41 determines that the alignment film 9 exists in the region 35 where the sealing member 26 is to be provided, the alignment film 9 existing in the region 35 where the sealing member 26 is to be provided (i.e., the alignment film 9 existing on the surface 2c of the metal pattern 2) is removed.

Note that the alignment film 9 may be removed by any techniques including, for example, a laser removal technique, a plasma removal technique, and a liftoff technique using a water-soluble resist. After removal of the alignment film 9 existing in the region 35 where the sealing member 26 is to be provided, steps S1-S10 are performed again to determine the presence or absence of the alignment film 9 in the region 35 where the sealing member 26 is to be provided (i.e., it is determined whether or not the alignment film 9 has been successfully removed from the region 35 where the sealing member 26 is to be provided). After confirming that the alignment film 9 does not exist in the region 35 where the sealing member 26 is to be provided, the fabrication process of the TFT substrate 10 is ended.

Also, as described above, in the width direction X of the region 35 where the sealing member 26 is to be provided, the metal pattern 2 is provided so that the position of the inner circumferential surface 2a of the metal pattern 2 coincides with the position of the inner circumferential surface 35a of the region 35 (i.e., in the region 35, the inner circumferential surface 2a of the metal pattern 2 and the inner circumferential surface 35a of the region 35 are on the same plane). As a result, as shown in FIGS. 6 and 8, the alignment film 9 is blocked at the position of the inner circumferential surface 2a of the metal pattern 2 (i.e., the inner circumferential surface 35a of the region 35 where the sealing member 26 is to be provided), whereby the formation of the alignment film 9 in the region 35 where the sealing member 26 is to be provided can be effectively reduced or prevented.

Thus, the TFT substrate 10 can be fabricated.

<CF Substrate Fabrication Process>

Initially, on the entire insulating substrate 21 (e.g., a glass substrate etc.), for example, a positive photosensitive resin in which a black pigment (e.g., carbon particles etc.) is dispersed is applied by spin coating, and the applied photosensitive resin is exposed to light through a photomask and then developed and heated, thereby forming the black matrix 27 having a thickness of about 2.0 μm.

Next, on the substrate on which the black matrix 27 has been formed, for example, a red-, green-, or blue-colored acrylic photosensitive resin is applied, and the applied photosensitive resin is exposed to light through a photomask and then developed to perform patterning, thereby forming a color layer with a selected color (e.g., a red color layer R) 28 having a thickness of about 2.0 μm. Moreover, for the two other colors, a similar process is repeated to for the two other color layers (e.g., a green color layer G and a blue color layer B) 28 each having a thickness of about 2.0 μm. Thus, the color filter layer 22 having the red color layer R, the green color layer G, and the blue color layer B is formed.

Next, on the substrate on which the color filter layer 22 has been formed, an acrylic photosensitive resin is applied by spin coating, and the applied photosensitive resin is exposed to light through a photomask and then developed, thereby forming the transparent layer 23 having a thickness of about 2 μm. Next, on the entire substrate on which the transparent layer 23 has been formed, for example, an ITO film is formed by sputtering, and thereafter, patterning is performed by photolithography, thereby forming the common electrode 24 having a thickness of about 1500 Å.

Next, on the entire substrate on which the common electrode 24 has been formed, an acrylic photosensitive resin is applied by spin coating, and the applied photosensitive resin is exposed to light through a photomask and then developed, thereby forming the photospacer 29 having a thickness of about 4 μm.

Next, on the entire black matrix 27, for example, a titanium film and an aluminum film are formed by sputtering, and thereafter, patterning is performed by photolithography, thereby forming the metal pattern 2 having a predetermined thickness (e.g., about 500 nm) in the shape of a frame in the region 35 where the sealing member 26 is to be provided.

Next, the entire substrate is washed, and thereafter, on the entire substrate on which the common electrode 24 has been formed, polyimide resin is applied by a printing technique etc., thereby forming the alignment film 48 having a thickness of about 200 nm.

Next, by using the determination method described above in steps S1-S10, the presence or absence of the alignment film 48 in the region 35 where the sealing member 26 is to be provided is determined.

In this case, as described above in step S10, if the alignment film determination unit 41 determines that the alignment film 48 does not exist in the region 35 where the sealing member 26 is to be provided, the fabrication process of the CF substrate 20 is ended.

On the other hand, as described above in step S9, if the alignment film determination unit 41 determines that the alignment film 48 exists in the region 35 where the sealing member 26 is to be provided, the alignment film 48 existing in the region 35 where the sealing member 26 is to be provided (i.e., the alignment film 48 existing on the surface 2c of the metal pattern 2) is removed by the aforementioned laser removal technique, plasma removal technique, or liftoff technique using a water-soluble resist, etc. After removal of the alignment film 48, steps S1-S10 are performed again to determine the presence or absence of the alignment film 48 in the region 35 where the sealing member 26 is to be provided. After confirming that the alignment film 48 does not exist in the region 35 where the sealing member 26 is to be provided, the fabrication process of the CF substrate 20 is ended.

Note that, also in this case, as described above, in the width direction X of the region 35 where the sealing member 26 is to be provided, the metal pattern 2 is provided so that the position of the inner circumferential surface 2a of the metal pattern 2 coincides with the position of the inner circumferential surface 35a of the region 35. As a result, as shown in FIG. 7, the alignment film 48 is blocked at the position of the inner circumferential surface 2a of the metal pattern 2 (i.e., the inner circumferential surface 35a of the region 35 where the sealing member 26 is to be provided), whereby the formation of the alignment film 48 in the region 35 where the sealing member 26 is to be provided can be effectively reduced or prevented.

Thus, the CF substrate 20 can be fabricated.

<Bonding Process>

Initially, for example, the sealing member 26 made of an ultraviolet curable resin is formed, using a dispenser, in the shape of a frame on the CF substrate 20 fabricated by the CF substrate fabrication process in the region 35 where the sealing member 26 is to be provided.

In this case, as shown in FIGS. 1 and 2, the sealing member 26 is formed around the liquid crystal layer 25 so that the position of the inner circumferential surface 2a of the metal pattern 2 formed on the CF substrate 20 coincides with the position of the inner circumferential surface 26a of the sealing member 26 in the width direction X of the sealing member 26, and the sealing member 26 covers the metal pattern 2.

Next, a liquid crystal material is dropped in a region inside the sealing member 26 of the CF substrate 20 on which the sealing member 26 has been formed.

Moreover, the CF substrate 20 on which the liquid crystal material has been dropped and the TFT substrate 10 which has been fabricated in the TFT substrate fabrication process are bonded together under reduced pressure, and thereafter, the two-substrate structure is exposed to the atmospheric pressure, so that pressure is applied to the front and rear surfaces of the two-substrate structure.

In this case, as shown in FIGS. 1 and 2, the sealing member 26 is positioned so that the position of the inner circumferential surface 2a of the metal pattern 2 formed on the TFT substrate 10 coincides with the position of the inner circumferential surface 26a of the sealing member 26 in the width direction X of the sealing member 26, and the sealing member 26 covers the metal pattern 2.

Next, the sealing member 26 sandwiched between the two substrates is irradiated with UV light, and thereafter, the two-substrate structure is heated, thereby curing the sealing member 26.

Thus, the liquid crystal display panel 1 of FIG. 1 can be fabricated.

Note that, in the bonding process, the liquid crystal material may be injected by a vacuum injection technique. In this case, initially, the sealing member 26 made of a thermosetting resin (e.g., epoxy resin) is formed in the shape of a frame on the CF substrate 20 in the region 35 where the sealing member 26 is to be provided. Thereafter, the TFT substrate 10 is put on the CF substrate 20 on which the sealing member 26 has been formed so that the TFT substrate 10 and the CF substrate 20 overlap in the display region H, whereby the TFT substrate 10 and the CF substrate 20 are joined together via the sealing member 26.

Next, the sealing member 26 is cured by a thermal treatment (e.g., a thermal treatment at 200° C. when epoxy resin is used). Thereafter, a liquid crystal material inlet (not shown) formed in the sealing member 26 is made contact with a liquid crystal material in vacuum atmosphere, and thereafter, the two-substrate structure is placed back in the atmosphere, whereby the liquid crystal material is injected through the liquid crystal material inlet into the inside of the sealing member 26. As a result, the liquid crystal layer 25 is formed inside the sealing member 26, and the TFT substrate 10 and the CF substrate 20 are bonded together. Note that after injection of the liquid crystal material, the liquid crystal material inlet is sealed by a sealing material, such as an ultraviolet curable resin etc.

According to this embodiment described above, the following advantages can be obtained.

(1) In this embodiment, in the region 35 where the sealing member 26 is to be provided, the metal pattern 2 is provided which reflects the infrared light 43 emitted from the Fourier transform infrared spectrometer 4 toward the Fourier transform infrared spectrometer 4 in order to determine the presence or absence of the alignment films 9 and 48 in the region 35. Therefore, the Fourier transform infrared spectrometer 4 can be used to perform a microscopic reflection technique, and therefore, based on an infrared absorption spectrum measured by the Fourier transform infrared spectrometer 4, the presence or absence of the alignment films 9 and 48 in the region 35 where the sealing member 26 is to be provided can be determined. Thus, the presence or absence of the alignment films 9 and 48 can be determined by non-contact measurement.

(2) In particular, after removal of the alignment films 9 and 48 existing in the region 35 where the sealing member 26 is to be provided, the presence or absence of the alignment films 9 and 48 in the region 35 where the sealing member 26 is to be provided can be determined. Therefore, it can be reliably confirmed whether or not the alignment films 9 and 48 has been successfully removed from the region 35 where the sealing member 26 is to be provided.

(3) As is different from confirmation performed by visual observation using an optical microscope, the result of determination of the presence or absence of the alignment films 9 and 48 does not vary from person to person, and in addition, the presence or absence of the alignment films 9 and 48 can be determined without destroying the liquid crystal display panel 1.

(4) The presence or absence of the alignment films 9 and 48 can be easily determined by non-contact measurement. Therefore, even if the alignment films 9 and 48 exist in the region 35 where the sealing member 26 is to be provided, the alignment films 9 and 48 can be removed quickly and easily. Therefore, the productivity and the yield can be improved.

(5) The metal pattern 2 is provided to perform a microscopic reflection technique using the Fourier transform infrared spectrometer 4, and therefore, the presence or absence of the alignment films 9 and 48 can be determined at low cost.

(6) The metal pattern 2 is provided in the region 35 where the sealing member 26 is to be provided. Therefore, the presence or absence of the alignment films 9 and 48 can be determined without impairing the external appearance.

(7) In this embodiment, the metal pattern 2 is positioned so that the inner circumferential surface 2a of the metal pattern 2 and the inner circumferential surface 35a of the region 35 are on the same plane. Therefore, the alignment films 9 and 48 can be blocked at the position of the inner circumferential surface 2a of the metal pattern 2, whereby the formation of the alignment films 9 and 48 in the region 35 where the sealing member 26 is to be provided can be effectively reduced or prevented.

(8) In this embodiment, the frame-shaped metal pattern 2 is provided along the inner circumferential surface 35a of the region 35. Therefore, the presence or absence of the alignment films 9 and 48 can be determined by non-contact measurement over the entire region 35 where the sealing member 26 is to be provided.

(9) In this embodiment, the width P of the metal pattern 2 is set to 50 μm or more. Therefore, in the Fourier transform infrared spectrometer 4, the accuracy of detection of infrared light reflected by the surface 2c of the metal pattern 2 can be improved.

(10) In this embodiment, the thickness C of the metal pattern 2 and the distance D between the TFT substrate 10 and the CF substrate 20 in the thickness direction Y of the liquid crystal display panel 1 are assumed to satisfy the relationship C<D. Therefore, when the TFT substrate 10 and the CF substrate 20 are bonded together via the sealing member 26, it is possible to avoid the problem that, due to its thickness, the metal pattern 2 interferes with the bonding of the TFT substrate 10 and the CF substrate 20. Therefore, the liquid crystal display panel 1 can be manufactured without changing the manufacture conditions.

(11) In this embodiment, the metal pattern 2 is made of one selected from the group consisting of tantalum, chromium, molybdenum, nickel, titanium, copper, and aluminum. Therefore, the metal pattern 2 can be made of a low-cost and versatile metal material.

(12) In this embodiment, the infrared light 44 reflected by the metal pattern 2 is received by the Fourier transform infrared spectrometer 4 to measure an infrared absorption spectrum, and based on the measured infrared absorption spectrum, the presence or absence of the alignment films 9 and 48 in the region 35 is determined. Therefore, when various alignment film removal techniques are examined, the effectiveness of these alignment film removal techniques can be easily determined. Therefore, the alignment film removal techniques can be examined easily and quickly.

(13) In this embodiment, an infrared absorption spectrum measured by the Fourier transform infrared spectrometer 4 is compared with another infrared absorption spectrum previously stored to determine the presence or absence of the alignment films 9 and 48 in the region 35. Therefore, the presence or absence of the alignment films 9 and 48 can be tested quickly and accurately using a simple technique.

Note that the above embodiment may be changed or modified as follows.

When a Fourier transform infrared spectrometer is used to measure an infrared absorption spectrum, an infrared absorption spectrum of the surface 2c of the metal pattern 2 to be analyzed may be measured using a high-sensitivity reflection technique (or reflection absorption spectroscopy).

Figure 14:
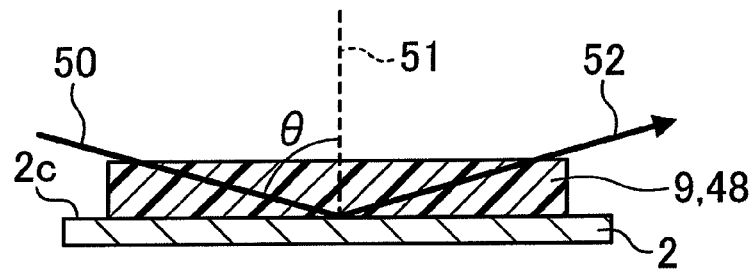
FIG. 14 is a diagram for describing a variation of a method for measuring an infrared absorption spectrum in a Fourier transform infrared spectrometer used in the method for testing a substrate for a liquid crystal display panel according to the embodiment of the present invention.
Figure 15:
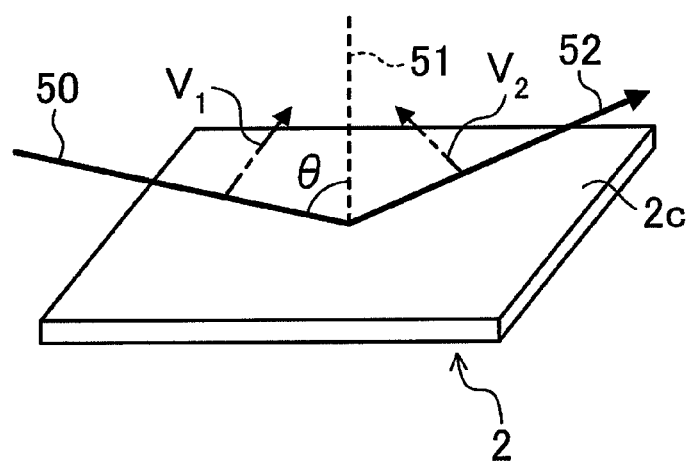
FIG. 15 is a diagram for describing a variation of the method for measuring an infrared absorption spectrum in a Fourier transform infrared spectrometer used in the method for testing a substrate for a liquid crystal display panel according to the embodiment of the present invention.

In the high-sensitivity reflection technique, as shown in FIGS. 14 and 15, infrared light (incident light) 50 is caused to enter the surface 2c of the metal pattern 2 at a predetermined incident angle (an angle between a normal line 51 of the metal pattern 2 and the infrared light 50) θ (75°≤θ≤85°), where the infrared light (P-polarized light) 50 is polarized in parallel to the incidence plane (a plane formed by the normal line 51 and the incident light 50). The infrared light 50 reflected by the surface 2c of the metal pattern 2 is projected again onto the light receiving surface of the detector provided in the Fourier transform infrared spectrometer 4. The presence or absence of the alignment films 9 and 48 in the region 35 where the sealing member 26 is to be provided is determined in a manner similar to steps S1-S10.

In the high-sensitivity measurement technique, the vibration direction (polarization direction) of the electric field vector of the infrared light is parallel to the incidence plane. Therefore, as shown in FIG. 15, the electric field vector $V_1$ of the incident light (i.e., the infrared light 50) and the electric field vector $V_2$ of the reflective light (infrared light 52) intensify each other at the surface 2c of the metal pattern 2, so that stationary vibrating electric field perpendicular to the surface 2c of the metal pattern 2 is formed.

Because the incident angle θ of the infrared light 50 is set to 75°≤θ≤85°, a distance over which the infrared light 50 transmits through the alignment films 9 and 48 formed on the surface 2c of the metal pattern 2 can be elongated.

Therefore, it is possible to detect a thin film (i.e., the alignment films 9 and 48) existing on the surface 2c of the metal pattern 2 with high sensitivity. Therefore, even when the alignment films 9 and 48 are considerably thin (e.g., several nanometers to several tens of nanometers), the presence or absence of the alignment films 9 and 48 in the region 35 where the sealing member 26 is to be provided can be determined.

Figure 16:
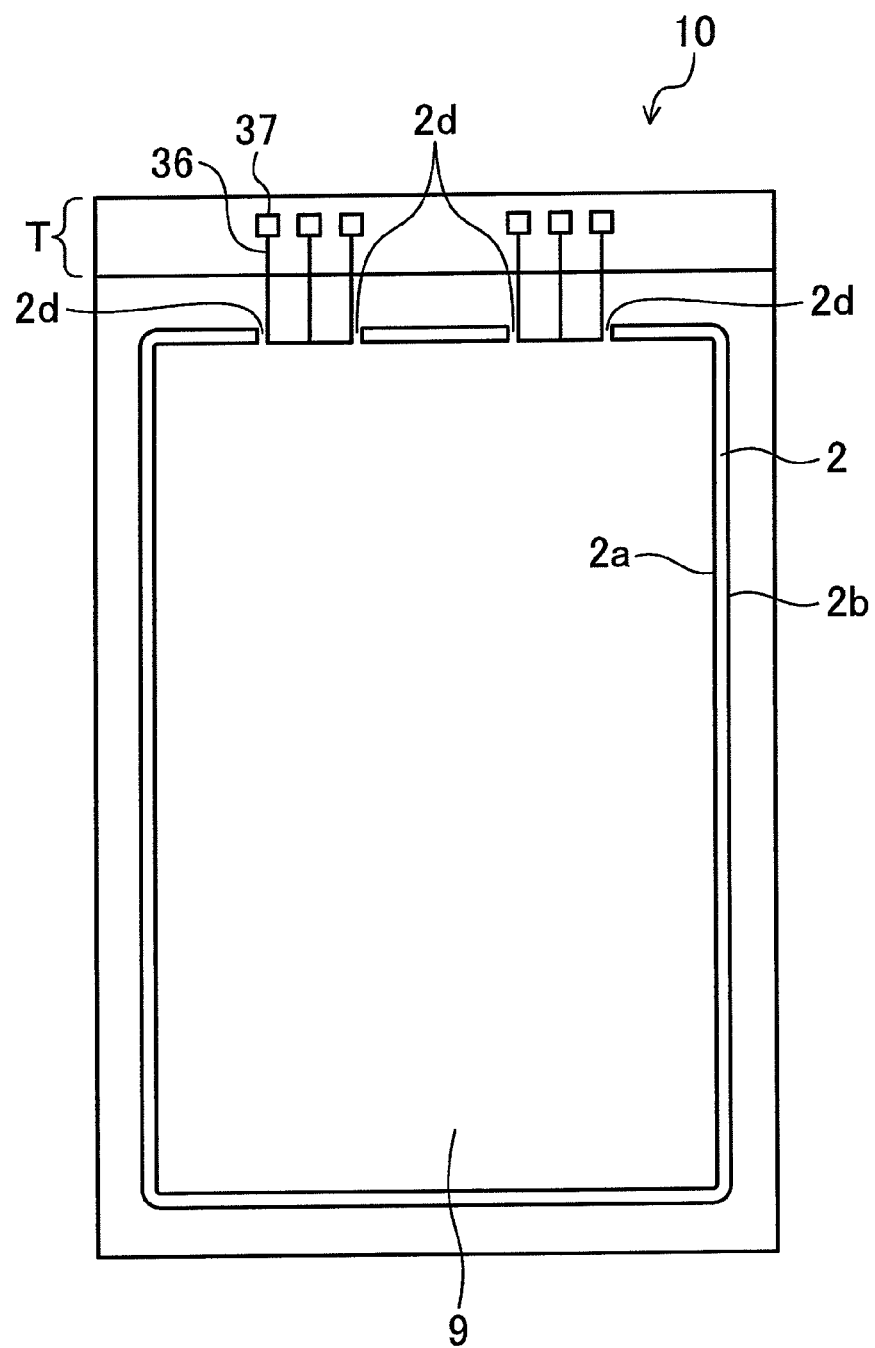
FIG. 16 is a plan view showing a variation of the metal pattern in the liquid crystal display panel of the embodiment of the present invention.

Also, as shown in FIG. 16, an interconnect extraction portion 2d for extracting a plurality of interconnects 36 (e.g., gate lines, source lines, etc.) into the terminal region T may be formed in the metal pattern 2. With this configuration, it is possible to reliably avoid contact between the metal pattern 2 and the interconnects 36, whereby electrical leakage between the metal pattern 2 and the interconnects 36 can be avoided.

Although, in the above embodiment, the metal pattern 2 is provided on both of the TFT substrate 10 and the CF substrate 20, the metal pattern 2 may be provided on at least one of the TFT substrate 10 and the CF substrate 20.

In the above embodiment, a voltage is applied to the pixel in an active matrix drive scheme. Alternatively, a voltage may be applied to the pixel in a passive matrix drive scheme. In this case, first electrodes may be provided on the TFT substrate 10, second electrodes may be provided on the CF substrate 20, and the first and second electrodes may be arranged to be orthogonal to each other, and pixels may be provided at respective corresponding intersection portions of the first electrodes and the second electrodes.

Although, in the above embodiment, the liquid crystal display panel 1 has been described as a display panel by way of example, the present invention is also applicable to other display panels, such as an organic EL display panel etc.

INDUSTRIAL APPLICABILITY

The present invention is useful for, for example, a liquid crystal display panel, in which a pair of substrates are bonded together with a predetermined gap being interposed therebetween and a liquid crystal layer (display medium layer) is enclosed in the gap between the pair of substrates, and a method for testing the substrates for the liquid crystal display panel.

DESCRIPTION OF REFERENCE CHARACTERS

1 LIQUID CRYSTAL DISPLAY PANEL
2 METAL PATTERN
2a INNER CIRCUMFERENTIAL SURFACE OF METAL PATTERN
4 FOURIER TRANSFORM INFRARED SPECTROMETER
8 SPECTRUM MEASUREMENT UNIT
9 ALIGNMENT FILM
10 TFT SUBSTRATE (FIRST SUBSTRATE)
20 CF SUBSTRATE (SECOND SUBSTRATE)
25 LIQUID CRYSTAL LAYER
26 SEALING MEMBER
35 REGION WHERE SEALING MEMBER IS TO BE PROVIDED

35a INNER CIRCUMFERENTIAL SURFACE OF REGION WHERE SEALING MEMBER IS TO BE PROVIDED
41 ALIGNMENT FILM DETERMINATION UNIT
42 STORAGE UNIT
43 INFRARED LIGHT
44 INFRARED LIGHT
48 ALIGNMENT FILM
C THICKNESS OF METAL PATTERN
D DISTANCE BETWEEN TFT SUBSTRATE AND CF SUBSTRATE
P WIDTH OF METAL PATTERN

The invention claimed is:

1. A liquid crystal display panel comprising:
a first substrate;
a second substrate facing the first substrate;
a liquid crystal layer provided between the first substrate and the second substrate;
an alignment film provided on a side closer to the liquid crystal layer of each of the first and second substrates, and configured to control alignment of the liquid crystal layer; and
a sealing member sandwiched between the first substrate and the second substrate, configured to bond the first substrate and the second substrate together, and formed in the shape of a frame surrounding the liquid crystal layer,
wherein
in a region where the sealing member is to be provided, a metal pattern is provided which is configured to reflect infrared light emitted from a Fourier transform infrared spectrometer toward the Fourier transform infrared spectrometer in order to determine the presence or absence of the alignment film in the region.

2. The liquid crystal display panel of claim 1, wherein the metal pattern is formed in the shape of a frame along an inner circumferential surface of the region.

3. The liquid crystal display panel of claim 2, wherein the metal pattern has a width of 50 μm or more.

4. The liquid crystal display panel of claim 2, wherein a thickness of the metal pattern and a distance between the first substrate and the second substrate in a thickness direction of the liquid crystal display panel satisfy a relationship represented by:

$$C<D$$

where C is the thickness of the metal pattern and D is the distance between the first substrate and the second substrate in the thickness direction of the liquid crystal display panel.

5. The liquid crystal display panel of claim 2, wherein the metal pattern is made of one selected from the group consisting of tantalum, chromium, molybdenum, nickel, titanium, copper, and aluminum.

6. The liquid crystal display panel of claim 1, wherein the metal pattern has a width of 50 μm or more.

7. The liquid crystal display panel of claim 6, wherein a thickness of the metal pattern and a distance between the first substrate and the second substrate in a thickness direction of the liquid crystal display panel satisfy a relationship represented by:

$$C<D$$

where C is the thickness of the metal pattern and D is the distance between the first substrate and the second substrate in the thickness direction of the liquid crystal display panel.

8. The liquid crystal display panel of claim 6, wherein the metal pattern is made of one selected from the group consisting of tantalum, chromium, molybdenum, nickel, titanium, copper, and aluminum.

9. The liquid crystal display panel of claim 1, wherein a thickness of the metal pattern and a distance between the first substrate and the second substrate in a thickness direction of the liquid crystal display panel satisfy a relationship represented by:

$$C<D$$

where C is the thickness of the metal pattern and D is the distance between the first substrate and the second substrate in the thickness direction of the liquid crystal display panel.

10. The liquid crystal display panel of claim 1, wherein the metal pattern is made of one selected from the group consisting of tantalum, chromium, molybdenum, nickel, titanium, copper, and aluminum.

11. The liquid crystal display panel of claim 1, wherein the metal pattern is provided on at least one of the first and second substrates.

12. The liquid crystal display panel of claim 1, wherein the liquid crystal display panel is driven in a passive matrix scheme or in an active matrix scheme.

13. A liquid crystal display panel comprising:
a first substrate;
a second substrate facing the first substrate;
a liquid crystal layer provided between the first substrate and the second substrate;
an alignment film provided on a side closer to the liquid crystal layer of each of the first and second substrates, and configured to control alignment of the liquid crystal layer; and
a sealing member sandwiched between the first substrate and the second substrate, configured to bond the first substrate and the second substrate together, and formed in the shape of a frame surrounding the liquid crystal layer, wherein
in a region where the sealing member is to be provided, a metal pattern is provided which is configured to reflect infrared light emitted from a Fourier transform infrared spectrometer toward the Fourier transform infrared spectrometer in order to determine the presence or absence of the alignment film in the region, and
the metal pattern is positioned so that an inner circumferential surface of the metal pattern and an inner circumferential surface of the region are on the same plane.

14. The liquid crystal display panel of claim 13, wherein the metal pattern is formed in the shape of a frame along an inner circumferential surface of the region.

15. The liquid crystal display panel of claim 13, wherein the metal pattern has a width of 50 μm or more.

16. The liquid crystal display panel of claim 13, wherein a thickness of the metal pattern and a distance between the first substrate and the second substrate in a thickness direction of the liquid crystal display panel satisfy a relationship represented by:

$$C<D$$

where C is the thickness of the metal pattern and D is the distance between the first substrate and the second substrate in the thickness direction of the liquid crystal display panel.

17. The liquid crystal display panel of claim 13, wherein the metal pattern is made of one selected from the group consisting of tantalum, chromium, molybdenum, nickel, titanium, copper, and aluminum.

18. A method for testing a liquid crystal display panel substrate, wherein
the liquid crystal display panel substrate includes
a substrate,
an alignment film provided on the substrate and configured to control alignment of a liquid crystal layer, and
a metal pattern provided on the substrate in a region where a sealing member is to be provided, and
the method includes at least:
an irradiation step of irradiating the metal pattern with infrared light using a Fourier transform infrared spectrometer;
a measurement step of receiving the infrared light reflected by the metal pattern using the Fourier transform infrared spectrometer to measure an infrared absorption spectrum; and
a determination step of determining, based on the infrared absorption spectrum, the presence or absence of the alignment film in the region.

19. The method of claim 18, wherein
in the determination step, the infrared absorption spectrum measured using the Fourier transform infrared spectrometer is compared with another infrared absorption spectrum previously stored, to determine the presence or absence of the alignment film in the region.

20. The method of claim 18, wherein
in the irradiation step, the infrared light polarized in parallel to an incidence plane is incident at an incident angle between 75° and 85° inclusive.

* * * * *